No. 684,195. Patented Oct. 8, 1901.
S. A. CRONE.
SIDE BEARING FOR CARS.
(Application filed May 2, 1901.)

(No Model.) 2 Sheets—Sheet 1.

WITNESSES:

INVENTOR
Seth A. Crone
BY
ATTORNEY

THE NORRIS PETERS CO., PHOTO-LITHO., WASHINGTON, D. C.

No. 684,195. Patented Oct. 8, 1901.
S. A. CRONE.
SIDE BEARING FOR CARS.
(Application filed May 2, 1901.)
(No Model.) 2 Sheets—Sheet 2.
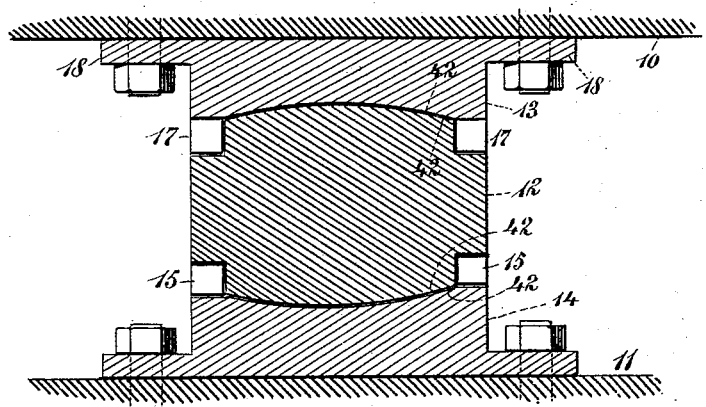
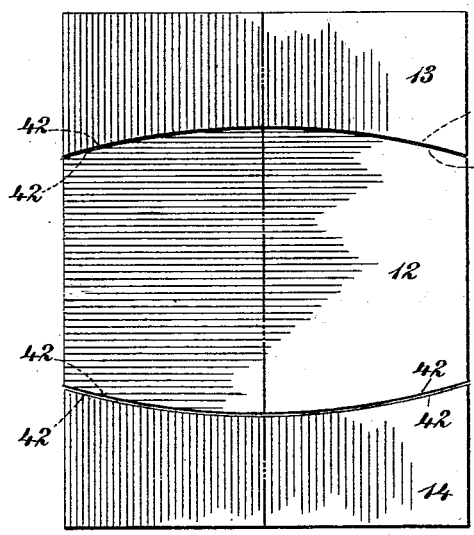
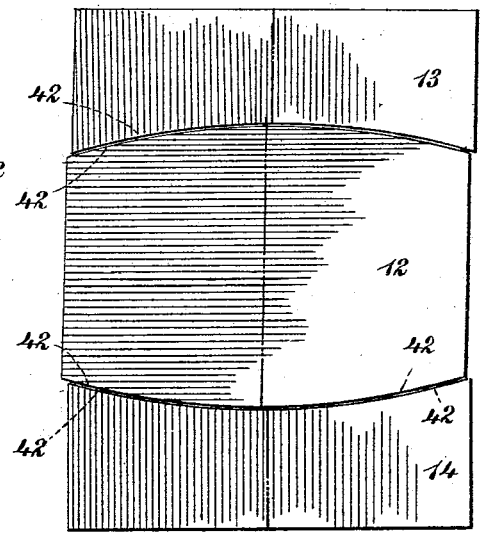
WITNESSES:
INVENTOR
Seth A. Crone
BY
ATTORNEY

UNITED STATES PATENT OFFICE.

SETH A. CRONE, OF NEW YORK, N. Y.

SIDE BEARING FOR CARS.

SPECIFICATION forming part of Letters Patent No. 684,195, dated October 8, 1901.

Application filed May 2, 1901. Serial No. 58,450. (No model.)

*To all whom it may concern:*

Be it known that I, SETH A. CRONE, a citizen of the United States, and a resident of New York city, in the county of New York and State of New York, have invented certain new and useful Improvements in Side Bearings for Cars, of which the following is a specification.

The invention relates to improvements in side bearings for railway-cars; and it consists in the novel features, arrangement, and combinations of parts hereinafter described, and particularly pointed out in the claims.

The object of the invention is to produce a thoroughly efficient and durable side bearing applicable to swiveling car-trucks and adapted to be applied in the ordinary manner intermediate the outer ends of the truck-bolster and body-bolster.

The invention will be fully understood from the detailed description hereinafter presented, reference being had to the accompanying drawings, in which—

Figure 1:
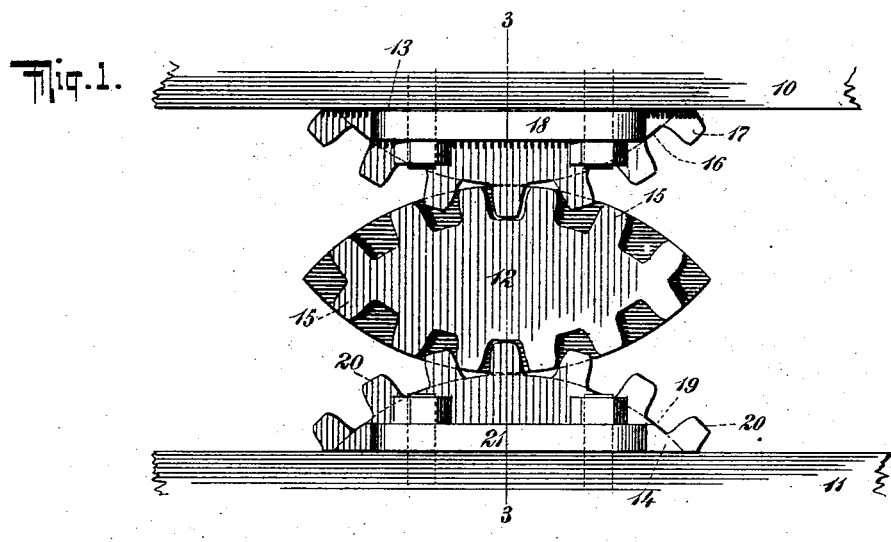
Figure 2:
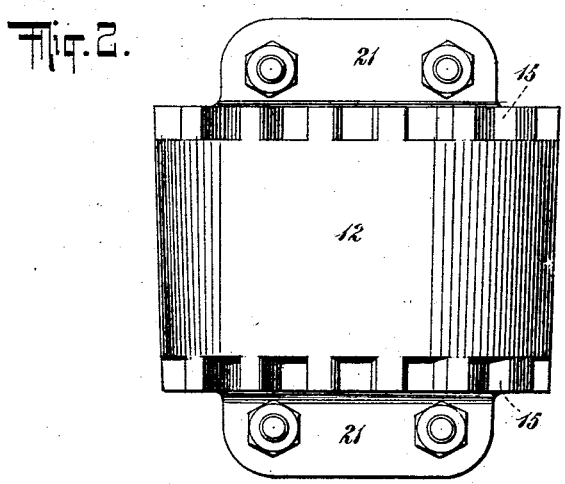

Figure 1 is a side elevation of a side bearing constructed in accordance with and embodying my invention, the upper and lower members of the side bearing being shown as applied to the body and truck bolsters, the latter being illustrated diagrammatically. Fig. 2 is a top view of the side bearing with the upper member thereof connected with the body-bolster omitted. Fig. 3 is a vertical section of same on the dotted line 3 3 of Fig. 1; and Figs. 4 and 5 are diagrammatic views taken on the line 3 3 of Fig. 1 of the several members of the side bearing, Fig. 4 representing the position of the middle rocking member when the parts are normal and there is no perceptible sagging of the car-body near the side sills, and Fig. 5 indicating the relative position the parts of the bearing will assume when, due to the load, the car-body sags downward at its sides, the lower or truck member remaining normal, the upper member becoming slightly inclined, and the middle rocking member having shifted slightly in a direction transversely of the car to accommodate itself to the facing surfaces of the upper and lower members.

In the drawings, 10 designates a portion of a body-bolster, 11 a portion of the truck-bolster, 12 the intermediate section of the side bearing, 13 the upper member of the side bearing secured to the body-bolster, and 14 the lower member of the side bearing secured to the truck-bolster, the said parts of the side bearing being illustrated in the normal position they occupy when the cars are traveling on straight tracks.

The intermediate portion 12 of the side bearing is in the form of an ellipse and is formed at its opposite sides with the series of gear-teeth 15, these gear-teeth being extended along the upper and lower edges of each side of the section and terminating at their outer ends about on a line with the horizontal surfaces of the said section 12. The section 12 is in the form of an ellipse or elongated, as shown in Fig. 1, and has curved upper and lower surfaces, which are the bearing-surfaces.

The upper member 13 of the side bearing has a convex or curved lower surface 16 to engage the upper curved surface of the middle member or section 12, and said upper member 13 at its opposite edges is formed with the gear-teeth 17, which project below the convex surface 16 and are adapted to engage the gear-teeth 15 on the middle member 12, while said convex surface 16 is in engagement with the upper convex surface of the middle member 12. The member 13 is intended to be bolted to the body-bolster 10, and is therefore formed with the lateral flanges 18 to receive the bolts by which said member may be secured to the body-bolster 10.

The lower member 14 of the side bearing corresponds with the upper member 13 thereof and is formed with the upper convex or curved surface 19 to engage the lower curved or convex surface of the middle member 12, and the said lower member 14 is formed at its opposite edges with the series of gear-teeth 20, which engage the gear-teeth at the opposite sides of the middle member 12, while the convex surface 19 of the member 14 is in engagement with the lower convex or curved surface of the middle member 12. The lower member 14 is formed with the lateral flanges 21 to receive the bolts by which said member may be firmly secured to the truck-bolster 11.

It will be observed that the middle member 12 has upper and lower curved or convex surfaces and is confined between the convex surfaces of the upper and lower members 13 14, the middle member 12 being prevented from losing its position by the engagement of the gear-teeth 15 with the gear-teeth 17 20 of said upper and lower members. When the cars are traveling on straight tracks, the parts of the side bearing will be in their normal position shown in Fig. 1; but during the travel of the cars around curves the usual motion of the car-body will, operating through the upper member 14, cause the member 12 to rock or turn against the facing convex or curved surfaces presented by the members 13 14, said middle member 12 being adapted to turn in either direction in accordance with the motion of said body. The contact of the facing surfaces of the upper and lower members 13 14 with the adjoining surfaces of the middle member 12 will compel the rocking motion of said member 12, and the presence of the intermeshing gear-teeth on said members serve further to compel the uniform or harmonious action of said members. The horizontal elongation or elliptic form of the middle member 12 is of importance for several reasons, among which it may be mentioned that by reason thereof the member 12 may perform a turning action for a definite distance toward either end without forcing the car-body upward, any increase of diameter presented by the middle member 12 intermediate the members 13 14 being compensated for by the fact that the outer surface of the middle member will turn up the curved face of the upper member and down the opposite curved face of the lower member. After the middle member 12 has turned beyond a predetermined limit the said member will force the car-body upward; but under many usual conditions the turning of the middle member 12 in either direction will not effect either the elevation or depression of the car-body, since the curvatures of the meeting surfaces of the members of the side bearing are such that they preserve a uniformity of distance between the truck and body bolsters. The invention is not limited, however, to so conforming the contacting surfaces of the several members of the bearing that uniformity of distance is preserved between the upper and lower members thereof, since in some instances it may not be necessary or even desirable to avoid elevating the upper member under the turning or rocking action of the middle member 12. The elongated form of the middle member 12 in connection with the convex surfaces of the upper and lower members 13 14 is also of importance in that adequate contacting surfaces are formed between the middle member 12 and the upper and lower members 13 14, and the tendency of flattening said surfaces is greatly diminished. The broad elongated curved surfaces presented by the middle member 12 are also of importance in that by reason thereof not only is flattening of the contacting surfaces in large measure avoided, but such flattening of surfaces is prevented from injuriously affecting the bearing, since by reason of the fact that the surfaces are elongated as well as curved any flattening of the surfaces would not for a considerable time interfere with the proper movement of the members of the side bearing. When a roller or a ball has been employed as the intermediate member of a side bearing, it presented a very limited amount of surface to the upper and lower members of the side bearing, and hence under such condition the said limited surface became more or less readily flattened, and the flattening thereof had an immediate prejudicial effect upon the side bearing as a whole. It is to overcome these among other objections that I have invented the side bearing made the subject of this application, it being my purpose to produce a thoroughly efficient and durable side bearing and one capable of withstanding the severe punishment to which side bearings are subjected.

The surfaces of the members of the side bearing will, as usual, be on lines radiating from the king-bolt of the truck, as indicated in the drawings, and the facing surfaces of the members of the side bearing may be either plain, as shown in Figs. 1 and 2, or slightly curved, as indicated at 42 in Figs. 3, 4, and 5. The purpose of slightly curving the end portions of the facing surfaces of the side bearing members is to enable the middle member 12 to adapt itself to the adjoining surfaces of the upper and lower members 13 14 under the different conditions of the load carried by the car-body. When the car-body is heavily loaded, especially in the case of the older construction of cars, there is a tendency in the outer side portions of the body to sag downward and create a greater pressure against the outer edges of the middle member 12 than at the inner edges thereof, and it is my purpose in the event of such increased pressure at the outer end of the middle member 12 to utilize the same in forcing the member 12 inward to a very slight extent, so that the entire width of surface at the upper and lower sides of the member 12 shall contact with the adjoining members 13 14, as indicated diagrammatically in Fig. 5, and it is for this reason that I curve the edges of the member 12, so that when the car-body is so loaded as to cause a sagging at the outer sides of the body the extra force created thereby will, acting on the curved surfaces 42 of the side bearing, serve to push or squeeze the middle member 12 slightly inward, so that the entire width of its surface will pass into firm contact with the entire width of the surface of the upper and lower members 13 14.

The normal relation of the members 12, 13, and 14 is that shown in Figs. 3 and 4; but when (due to the load) the sides of the car-body sag downward and the upper members 13 become slightly inclined the middle members 12 (due to the pressure then coming on their outer edges and assisted by the jarring of the car) will move slightly inward in a direction transversely of the car and allow the upper members 13 to settle firmly upon them, as denoted in Fig. 5, wherein it will be seen that the several members of the side bearing are in full contact with one another even though the upper member 13 has become inclined and the middle member 12 has shifted slightly, this contact of the members of the side bearing being permitted by the employment of the surfaces 42, which are curved in a direction transversely of the car. The middle member 12 only shifts to a slight extent, and hence this action, it seemed, could be best shown by the diagram presented in Fig. 5.

My side bearing is also applicable for use intermediate the ends of a truck-bolster and the tops of the spring-caps below the same or between the lower ends of said springs and their seat, so as to allow the truck-bolster to have a limited endwise motion, in which location the convex surfaces of the bearing members will be in line with the truck-bolster.

What I claim as my invention, and desire to secure by Letters Patent, is—

1. A bearing for cars comprising the upper and lower secured members having convex facing surfaces, combined with the intermediate member 12 of elongated or elliptical outline and having convex upper and lower surfaces to engage the convex facing surfaces of the said upper and lower members; substantially as set forth.

2. A bearing for cars comprising the upper and lower members having the convex facing surfaces and gear-teeth, combined with the elongated rocking intermediate member 12 having convex upper and lower surfaces to engage the convex surfaces of said upper and lower members and also having the gear-teeth to mesh with the said teeth on said upper and lower members; substantially as set forth.

3. A bearing comprising upper and lower members, and the intermediate rocking member 12 of elliptic or elongated form and presenting convex upper and lower surfaces to the facing surfaces of said upper and lower members; substantially as set forth.

4. A bearing comprising upper and lower members, and the intermediate rocking member 12 of elliptic or elongated form and presenting convex upper and lower surfaces to the facing surfaces of said upper and lower members, said members being provided with the intermeshing gear-teeth; substantially as set forth.

5. A bearing for cars comprising the upper and lower members having convex facing surfaces, combined with the intermediate member 12 of elongated or elliptical outline and having convex upper and lower surfaces to engage the convex facing surfaces of the said upper and lower members, said members being transversely rounded so as to compel the intermediate member under an excess of load to adapt itself to the surfaces of said upper and lower members; substantially as set forth.

Signed at New York, in the county of New York and State of New York, this 1st day of May, A. D. 1901.

SETH A. CRONE.

Witnesses:
CHAS. C. GILL,
GUNDER GUNDERSON.